(12) United States Patent
Tanabe

(10) Patent No.: US 6,429,925 B2
(45) Date of Patent: Aug. 6, 2002

(54) IMAGE RECORDING APPARATUS INCLUDING VIBRATION DAMPING MEANS

(75) Inventor: Tsuyoshi Tanabe, Kanagawa (JP)

(73) Assignee: Fuji Photo Film, Co., Ltd., Kanagawa (JP)

(*) Notice: Subject to any disclaimer, the term of this patent is extended or adjusted under 35 U.S.C. 154(b) by 0 days.

(21) Appl. No.: 09/790,586

(22) Filed: Feb. 23, 2001

Related U.S. Application Data

(63) Continuation of application No. 09/123,582, filed on Jul. 28, 1998, now abandoned.

(30) Foreign Application Priority Data

Jul. 28, 1997 (JP) .............................. 9-201479

(51) Int. Cl.[7] ........................ G03B 27/52; G03B 27/32; G03B 29/00; G03B 27/58
(52) U.S. Cl. ............................ 355/40; 355/27; 355/28; 355/72; 355/64
(58) Field of Search ............................ 355/39, 40, 28, 355/46, 72, 27, 64; 399/112; 347/138

(56) References Cited

U.S. PATENT DOCUMENTS

| | | | |
|---|---|---|---|
| 4,417,260 A | * 11/1983 | Kawai et al. | 347/138 |
| 5,107,304 A | * 4/1992 | Haneda et al. | 355/296 |
| 5,504,555 A | * 4/1996 | Yamamoto | 355/29 |
| 5,929,975 A | * 7/1999 | Matsumoto | 355/46 |
| 5,984,445 A | * 11/1999 | Morita et al. | 355/39 |

FOREIGN PATENT DOCUMENTS

| | | |
|---|---|---|
| JP | 08314022 | 11/1996 |
| JP | 1120984 | 1/1999 |

* cited by examiner

Primary Examiner—Russell Adams
Assistant Examiner—Peter B. Kim
(74) Attorney, Agent, or Firm—Birch, Stewart, Kolasch & Birch, LLP

(57) ABSTRACT

The improved image recording apparatus comprises a main scanning section; an auxiliary scanning section; and an upstream transport section; wherein a light-sensitive material, as it is transported in an auxiliary scanning direction after its position in a main scanning direction was regulated by the upstream transport section, is illuminated with recording light beams, whereby the light-sensitive material is scanned two-dimensionally with the recording light beams to record an image on the light-sensitive material. The apparatus further includes vibration damping members by which the main scanning section, the auxiliary scanning section and the upstream transport section are coupled to other components of the image recording apparatus in such a way as to insulate vibrations. During image recording on sheets of light-sensitive material with light beams, any adverse effects of internal and external vibrations are sufficiently prevented, insulated or damped to prevent the occurrence of offsets in the position of the light-sensitive material, unevenness in its transport in the auxiliary scanning direction and other problems that would otherwise cause unevenness in image.

20 Claims, 6 Drawing Sheets

IMAGE RECORDING APPARATUS INCLUDING VIBRATION DAMPING MEANS

This application is a continuation of application Ser. No. 09/123,582, filed on Jul. 28, 1998, abandoned the entire contents of which are hereby incorporated by reference and for which priority is claimed under 35 U.S.C. §120; and this application claims priority of Application Ser. No. 9-201479 filed in Japan on Jul. 28, 1997 under 35 U.S.C. §119.

BACKGROUND OF THE INVENTION

This invention relates to an image recording apparatus that records an image by scanning with light beams modulated with digital image signals.

In commonly employed photographic printing apparatus, an image is recorded on a photographic film such as a negative or reversal film and the light transmitted through the photographic film is directly focused on an unreeled intermittently moving light-sensitive material such as photographic paper; by this a real exposure, the recorded image is continuously printed on the roll of light-sensitive material.

In copiers capable of reproducing transmission-type originals such as photographic films, slit scanning light that has passed through the photographic film moving relative to the light source is directly focused on a light-sensitive material, for example, one in a sheet form that is being transported concurrently in an auxiliary scanning direction which is perpendicular to the slit length; by this slit scan exposure, the image on the photographic film is printed onto the light-sensitive material.

These are so-called "direct (analog) exposure" techniques in which the projected light from the photographic film is directly used to have the image on the photographic film printed on the light-sensitive material. A new technology has recently been proposed and this is a digital exposure system. Briefly, the image on a photographic film is read photoelectrically from the projected light and converted to digital image signals, which are subjected to various image processing operations to produce recording image signals; light beams such as laser beams modulated in accordance with the recording image signals are scanned one-dimensionally (in a main scanning direction) such that a roll of light-sensitive material being transported in an auxiliary direction perpendicular to the main scanning direction is exposed by raster scanning. The Applicant has put on the market a digital photoprinter that implements this digital exposure system.

One major advantage of the digital photoprinter is that when the image on a photographic film is reproduced by photographic printing on a light-sensitive material such as photographic paper, part or all of the image signals read from the photographic film are subjected to color and/or tonal correction such that the quality of the reproduced image is improved by appropriate processing such as sharpening or that the reproduced image on a film having failures such as under-exposure or over-exposure that are problematic in photographic printing or a film having color failures from shooting with rear light or an electronic flash, especially the image reproduced on a failure negative film is rendered to be in an appropriate condition or improved in quality. Another advantage is that on account of the use of digital image signals, a computer can be introduced for image generation or splitting or in order to perform editing jobs such as compositing and tiling more than one image, image segments, character images and so forth. If desired, the digital image signals may be loaded as a video file into various electronic image recording media so that they can be read, reproduced and edited on a computer and outputted on a hard copy whenever it is necessary.

With the digital photoprinter in which the roll of light-sensitive material being unreeled and transported in an auxiliary scanning direction is exposed by raster scanning with deflected light beams, the image to be reproduced must be recorded on the unreeled light-sensitive material over the entire area in an appropriate way by means of the deflected light beams. However, if vibrations from within and/or from the outside of the recording apparatus are transmitted to the main scanning section which issues the deflected light beams or the auxiliary scanning section in which the unreeled light-sensitive material is transported in the auxiliary scanning direction, displacements or jumps will occur in the relative positions of the light beams and the light-sensitive material, eventually causing unevenness in the reproduced image.

To avoid this problem, the digital photoprinter which relies upon the digital exposure system is adapted to form a loop of the unreeled light-sensitive material in both upstream and downstream of the auxiliary scanning section and, in addition, a unitary assembly of the main and auxiliary scanning sections is coupled to the other parts of the apparatus, in particular, its frame via rubber vibration insulators so that both the main and auxiliary scanning sections are vibrationally insulated from the other parts, thereby preventing not only internal but also external vibrations from being transmitted to these scanning sections, thereby ensuring that no unevenness will occur in the reproduced image.

The digital photoprinter has an additional advantage in that the position of the unreeled light-sensitive material, particularly in the main scanning direction can be easily regulated by the transport guide placed immediately upstream of the auxiliary scanning section. However, if sheets of light-sensitive material are to be exposed by raster scanning with deflected light beams as they are transported in the auxiliary scanning direction, recording must be done in such a way that the image to be reproduced just fits within the defined area of each sheet and to meet this need, the sheets of light-sensitive material have to be arranged with high precision in position, particularly in the position in the main scanning direction. The register section for meeting this requirement is more complex and of higher precision than in the case of processing the unreeled light-sensitive material and, hence, must be provided upstream of the auxiliary scanning section. Such being the case, the conventional vibration damping and insulating system (mechanism) is incapable of insulating the internal or external vibrations so that they will not adversely affect the exposure by raster scanning.

Under the circumstances, it has been impossible to realize a high-performance low-cost digital photoprinter that performs raster scan exposure on sheets of light-sensitive material, for example, those in a sheet form prepared by cutting the unreeled light-sensitive material into specified lengths.

SUMMARY OF THE INVENTION

An object, therefore, of the present invention is to provide an image recording apparatus which, when sheets of light-sensitive material being transported in an auxiliary scanning direction, such as those in a cut sheet form prepared by cutting an unreeled light-sensitive material into specified lengths, are exposed by raster scanning with modulated light beams either deflected or arranged in the main scanning direction generally perpendicular to the auxiliary scanning direction, is capable of insulating, rejecting or preventing the adverse effects of both internal and external vibrations so that they will not cause any unevenness in images, thereby ensuring the production of uniform high-quality images.

The stated object of the invention can be attained by an image recording apparatus comprising:

a main scanning section that performs main scanning with issued recording light beams either deflected or arranged one-dimensionally in a main scanning direction;

an auxiliary scanning section by means of which sheets of a light-sensitive material to be illuminated with said issued recording light beams from said main scanning section are transported in an auxiliary scanning direction perpendicular or generally perpendicular to said main scanning direction; and an upstream transport section that is located upstream of said auxiliary scanning section in a transport direction of the light-sensitive material, that transports said light-sensitive material and which has a register means by which a position of said light-sensitive material in said main scanning direction before it is transported to said auxiliary scanning direction is brought into alignment with a prescribed position;

wherein said light-sensitive material, as it is transported in said auxiliary scanning direction after its position in said main scanning direction was regulated by said upstream transport section, is illuminated with said recording light beams that performs main scanning in said main scanning direction, whereby said light-sensitive material is scanned two-dimensionally with said recording light beams to record an image on said light-sensitive material, said apparatus further including vibration damping means by which said main scanning section, said auxiliary scanning section and said upstream transport section are combined into a unitary assembly and coupled to other components of the image recording apparatus in such a way as to insulate vibrations.

Preferably, an optical flat of said main scanning section, said auxiliary scanning section and said upstream transport section are connected and fixed by connecting means to form the unitary assembly and the resulting unitary assembly of the optical flat of said main scanning section, said auxiliary scanning section and said upstream transport section is coupled to a main frame of the image recording apparatus via said vibration damping means.

In the first embodiment of the invention, it is also preferred that the image recording apparatus further includes a light-sensitive material supply section comprising:

a magazine that is located upstream of said upstream transport section and which contains a roll of said light-sensitive material; and a cutter by means of which said light-sensitive material as unreeled from said magazine is cut to a specified length of sheet which is determined by said image to be recorded.

In a preferred case of said image recording apparatus, in addition to said main scanning section, said auxiliary scanning section and said upstream transport section, said light-sensitive material supply section is combined into a unitary assembly and coupled to other components of the image recording apparatus by said vibration damping means in such a way as to insulate vibrations.

More preferably, the optical flat of said main scanning section, said auxiliary scanning section, said upstream transport section and said light-sensitive material supply section are connected and fixed by said connecting means to form the unitary assembly and the resulting unitary assembly of the optical flat of said main scanning section, said auxiliary scanning section, said upstream transport section and said light-sensitive material supply section are coupled to the main frame of the image recording apparatus via said vibration damping means.

In yet another preferred embodiment, a loop is formed of said unreeled light-sensitive material between said cutter in said light-sensitive material supply section and said register means in said upstream transport section and said unreeled light-sensitive material to be subjected to main scanning in said main scanning section is cut to a specified length of sheet by means of said cutter as it is transported in the auxiliary scanning direction through said auxiliary scanning section.

Alternatively, said register means in said upstream transport section is located just next to said cutter in said light-sensitive material supply section and said light-sensitive material is transported by means of said upstream transport section as its position in said main scanning direction is aligned to the prescribed position by said register means.

The object of the invention can also be attained by an image recording apparatus comprising:

a main scanning section that performs main scanning with issued recording light beams either deflected or arranged one-dimensionally in a main scanning direction; and an auxiliary scanning section by means of which sheets of a light-sensitive material to be illuminated with said issued recording light beams from said main scanning section are transported in an auxiliary scanning direction perpendicular or generally perpendicular to said main scanning direction;

wherein said light-sensitive material as it is transported in said auxiliary scanning direction is illuminated with said recording light beams that performs main scanning in said main scanning direction, whereby said light-sensitive material is scanned two-dimensionally with said recording light beams to record an image on said light-sensitive material, said apparatus further including vibration damping means by which said main scanning section and said auxiliary scanning section are combined into a unitary assembly and coupled to other components of the image recording apparatus in such a way as to insulate vibrations.

Preferably, said auxiliary scanning section has a sensor for detecting positions in both said main and auxiliary scanning directions of said light-sensitive material being transported in the auxiliary scanning direction and a means of adjusting a recording position in which said image is to be recorded on said light-sensitive material with said recording light beams.

DETAILED DESCRIPTION OF THE INVENTION

The image recording apparatus of the invention will now be described with reference to the preferred embodiments shown in the accompanying drawings.

Figure 1:
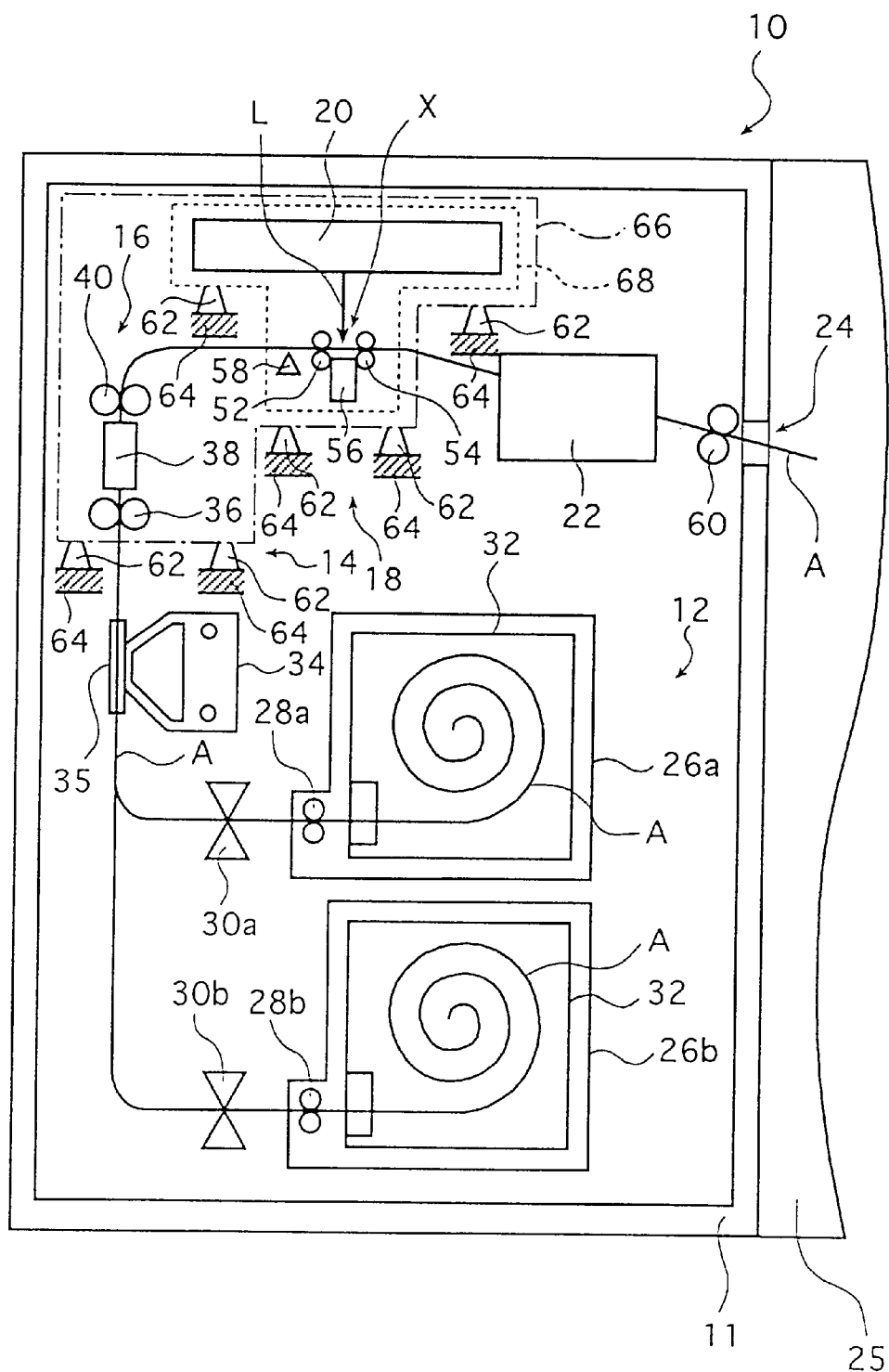
FIG. 1 is a schematic section of an embodiment of the image recording apparatus of the invention.

FIG. 1 shows schematically an embodiment of the image recording apparatus of the invention. The apparatus generally indicated by 10 in FIG. 1 is for recording an image (to be more exact, a latent image) on a sheet of light-sensitive material A as it is exposed by raster scanning with light beams such as laser beams deflected one-dimensionally, i.e., in the main scanning direction. The sheet A is transported in an auxiliary scanning direction generally perpendicular to the main scanning direction. The apparatus 10 comprises a light-sensitive material supply section 12 for feeding cut sheets of light-sensitive material A (this section is hereinafter referred to as the "supply section"), a back printing section 14 for recording back print information on the back side of a supplied sheet of light-sensitive material A, a register section 16 which regulates both the posture of the sheet A on which the back print information has been recorded and its position in the main scanning direction such that it is correctly positioned for the main scanning direction (i.e., aligned), a main scanning section 20 for issuing laser beams deflected in the main scanning direction, an auxiliary scanning section 18 that is provided downstream of the register section 16 and by means of which the light-sensitive material A that has been aligned and which is being exposed by raster scanning with the deflected laser beams from the main scanning 20 is transported in the auxiliary scanning direction generally perpendicular to the main scanning direction, and a distributing section 22 for distributing individual sheets of the exposed light-sensitive material A into a plurality of rows.

The image recording apparatus 10 of the invention is of such a type that the exposed sheets of light-sensitive material that have been distributed into multiple rows in the distributing section 22 are ejected as such to emerge from an outlet 24 (to be described later) and enter a light-sensitive material processor 25 connected to the outlet 24. In the illustrated image recording apparatus 10, the back printing section 14 and the register section 16 combine to form the upstream transport unit of the invention.

Needless to say, transport means such as transport roller pairs for transporting the light-sensitive material A to various locations, guides for transport of the light-sensitive material A, various sensors and other various members that are provided in ordinary recording apparatus are provided in the image recording apparatus 10 as required although they are omitted from FIG. 1 in order to clarify the basic construction of the apparatus.

In the recording apparatus 10, the supply section 12 comprises loaders 26a and 26b, withdrawing roller pairs 28a and 28b, and cutters 30a and 30b. The loader 26a (or 26b) is a site at which a magazine 32 containing a roll of light-sensitive material A in a lightproof case, with the recording side (where emulsion is coated) facing outward, is loaded. The magazines 32 to be loaded in the loaders 26a and 26b are usually adapted to contain different types of light-sensitive material A which is characterized by their size (width), surface gloss (silk-finish, matte and so forth), specifications (e.g., thickness and base type), and so forth.

The withdrawing roller pair 28a or 28b in the supply section 12 is operated to unreel and withdraw the light-sensitive material A from the magazine 32 in the associated loader 26a or 26b, respectively, and transports it downstream toward the back printing section 14. The transport of the light-sensitive material A stops at the point of time when it has been transported downstream from the cutter 30a or 30b by a length corresponding to each of the prints to be produced. Subsequently, the cutter 30a or 30b turns on to cut the unreeled light-sensitive material A to individual sheets of a specified length. The illustrated supply section 12 is adapted to be such that the roll of light-sensitive material A in the magazine 32 is unreeled, cut to specified lengths by means of the cutter 30a or 30b and supplied as cut sheets. This is not the sole case of the invention and a cassette containing a stack of sheets of light-sensitive material A may be placed within at least one of the loaders 26a and 26b such that the individual sheets are taken out one by one by means of a pickup roller (not shown) and transported toward the back printing section 14.

The back printing section 14 records on the back side (where no emulsion is coated) of the light-sensitive material A a back print consisting of various pieces of information, such as the date when the image was taken, the date of printing (exposure), frame number, film identification (ID) number (code), ID number of the camera used to take the image and ID number of the photoprinter. The back printing section 14 consists of a back printer 34 and a platen guide 35. The back printer 34 may be of any type that is capable of marking with a water-insoluble ink or the like that will not be erased even if the light-sensitive material A is subjected to wet processing (as with the developing solution, bleach-fixing solution and rinsing water) in the processor 25 connected to the recording apparatus 10. Examples of the back printer 34 include a dot impact printer, a thermal transfer printer and an ink-jet printer. A particularly preferred printer is an ink-jet printer that uses a heat-fusible ink that is water-insoluble and which is solid at ordinary temperatures.

In the illustrated back printing section 14, the light-sensitive material A cut to sheets of a specified length are guided one by one through the platen guide 35 as the necessary back print information is recorded with the back printer 34.

After back printing in the back printing section 14, the sheet of light-sensitive material A is transported to the register section 16. The register section 16 helps ensure correctness for the transport of the sheets of light-sensitive material A in the auxiliary scanning direction in the auxiliary scanning section 18 and for the exposure by raster scanning in the main scanning section 20. To this end, the register section 16 regulates not only the posture of the sheet of light-sensitive material A before it is transported into the auxiliary scanning section 18 but also its position in the main scanning direction so that the light-sensitive material A is in agreement with the desired posture and position. Having this capability, the register section 16 comprises an upstream transport roller pair 36, a transport guide 38 and a downstream transport roller pair 40.

The transport guide 38 may be of any type insofar as it functions as a width guide that regulates the position of each sheet of light-sensitive material A at least in the main scanning direction, namely, in the width direction perpendicular to the transport of the light-sensitive material A, thereby regulating both the posture of the light-sensitive material A before it is transported into the auxiliary scanning section 18 and its position in the main scanning direction such that it is brought into agreement with the correct posture and position. A preferred example of the transport guide 38 to be used in the invention functions not only as a loop guide that guides the light-sensitive material A downstream and which forms a loop (slack portion) of the material A as required but also as an edge (width) guide which guides the light-sensitive material A in the direction of its width so that its position in the width direction is regulated and its posture is controlled.

An example of the transport guide 38 that can be used in the invention has been proposed by the Applicant in Japanese Patent Application No. 182390/1997. An embodiment of the transport guide 38 is shown schematically in FIG. 2 (front view) and FIG. 3 (side view). The transport guide 38 shown in FIGS. 2 and 3 comprises a pair of U-shaped width guides 42 and 44 that can approach or depart from each other in the main scanning direction indicated by arrow x and split transport roller pairs 50 (50a and 50b) that are provided in correspondence with recesses 46 and 48 formed in the inner end faces of the upper and lower sides 42a and 42b of the width guide 42, as well as the upper and lower sides 44a and 44b of the width guide 44 in areas part of the way in the direction of arrow y. One of the opposed guide surfaces 42a and 42b of the width guide 42 and one of the opposed guide surfaces 44a and 44b of the width guide 44, which are 42a and 44a in the illustrated case, are used as pivotal guides 42c and 44c in those areas which are upstream of the split transport roller pairs 50 and supported in such a way that they can pivot outside the split transport roller pair 50a whereas they are axially movable along the rotating shafts 50c and 50d between the roller pairs 50a and 50b.

Figure 3:
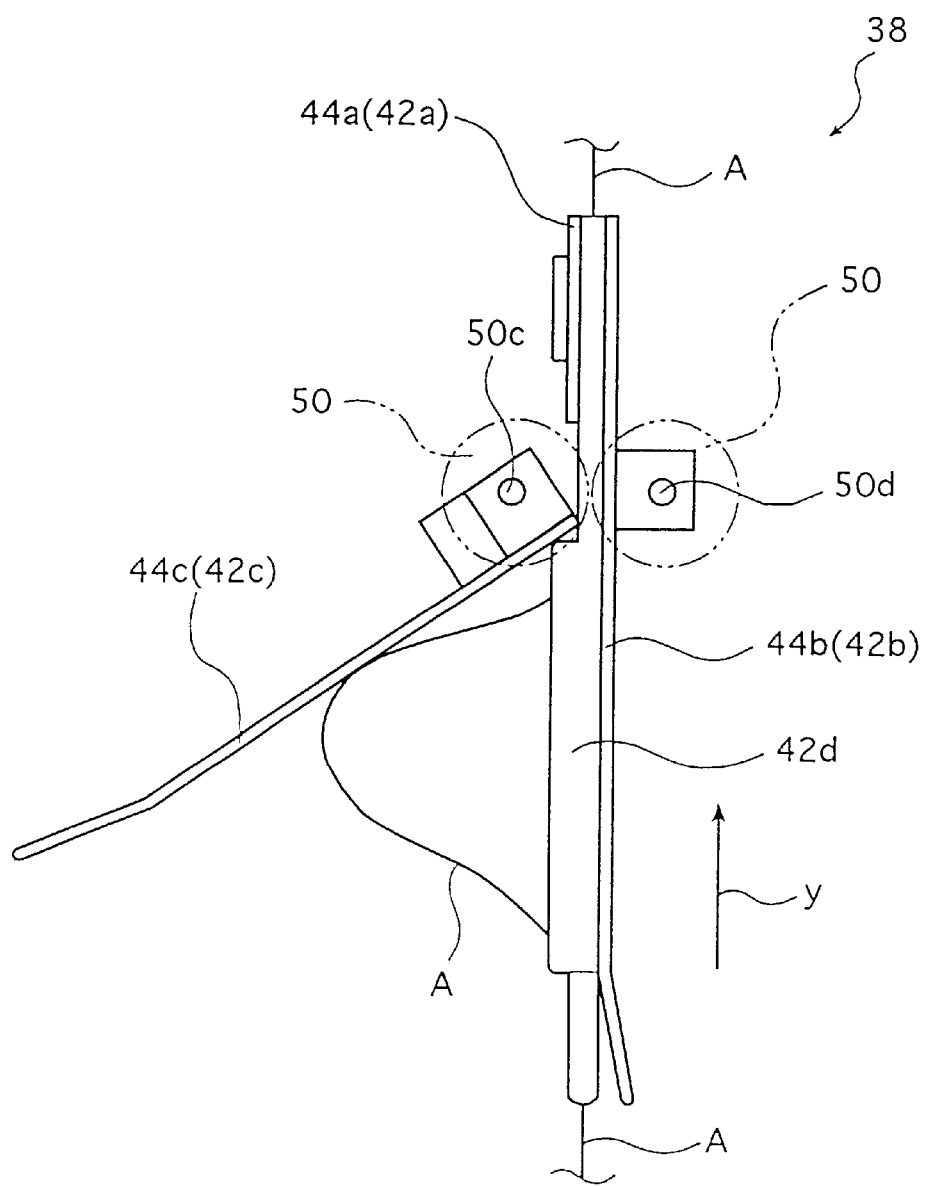
FIG. 3 is schematic section III—III of the transport guide shown in FIG. 2 according to one embodiment of its operation.

Having this structure, the transport guide 38 is capable of forming a loop of the light-sensitive material A in the area between the upstream transport roller pair 36 and each of the split transport roller pairs 50 (see FIG. 3). At the same time, the inner sides 42d and 44d of the width guides 42 and 44 which serve as surfaces that regulate the edges of the light-sensitive material A regulate both of its edges from opposite sides so that its posture is kept parallel to the direction of transport y whereas its center position in the main scanning direction x is brought into registry with the specified appropriate position.

Figure 2:
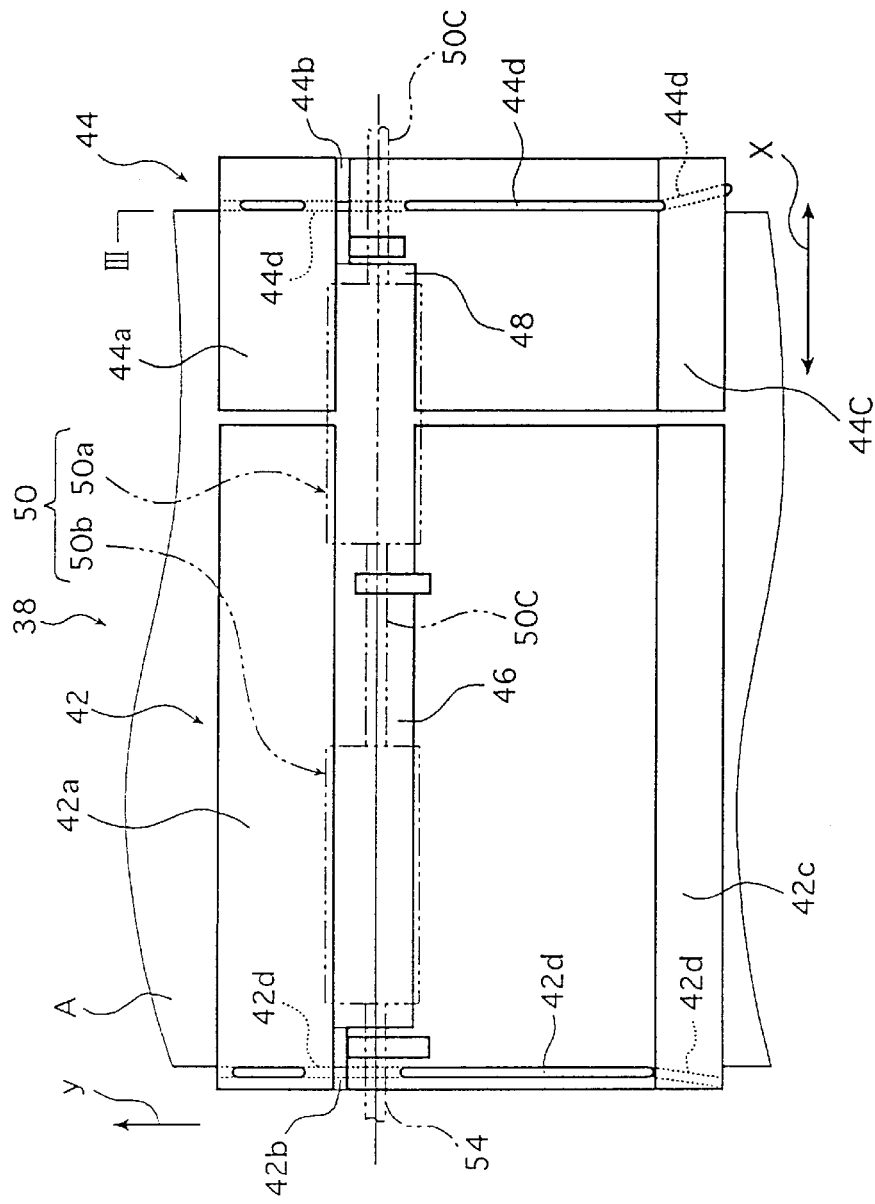
FIG. 2 is a schematic front view of the transport guide used in the image recording apparatus shown in FIG. 1.

The transport guide 38 shown in FIGS. 2 and 3 is adapted to be such that irrespective of the width of the light-sensitive material A, the U-shaped width guides 42 and 44 can either approach or depart from each other to ensure that the center position of the light-sensitive material A in the main scanning direction x is brought into agreement with the specified appropriate position (i.e., center registry is attained). However, this is not the sole case of the invention and only one of the U-shaped width guides 42 and 44 may be adapted to be movable in the x direction and the position of one edge of the light-sensitive material A in the x direction is brought into agreement with the specified appropriate position (i.e., side registry is attained).

After its posture and its position in the main scanning direction have been correctly adjusted by means of the transport roller pair 36 and the transport guide 38 in the register section 16, the light-sensitive material A is transported to the auxiliary scanning section 18 by means of the downstream transport roller pair 40. The auxiliary scanning section 18 comprises two transport roller pairs 52 and 54 located on opposite sides of the exposing position X (the main scanning line), an exposure guide 56 for holding the light-sensitive material A at the exposing position X in a more advantageous way, and an edge detecting sensor 58 for detecting both the advancing and trailing edges of each sheet of light-sensitive material A. The light-sensitive material A as it is held flat in the exposing position X by means of the exposure guide 56 is transported in the auxiliary scanning direction (to the right in FIG. 1) which is perpendicular to the main scanning direction by means of the transport roller pairs 52 and 54 which are driven to rotate in synchronism.

The time of starting the exposure of the light-sensitive material A with the light beams L issued from the main scanning section 20 is controlled by detection of the advancing edge of the light-sensitive material A with the edge detecting sensor 58. Briefly, the exposure starts a specified time after the issuance of the detection signal.

As already mentioned, the light beams L from the main scanning section 20 are deflected in the main scanning direction, so the light-sensitive material A in the main scanning section 20 is exposed by two-dimensional raster scanning with the light beams L modulated in accordance with the image to be recorded, whereby a latent image is recorded.

In the auxiliary scanning section 18, one of the lower rollers in the two transport roller pairs 52 and 54 is connected to a drive source and these lower rollers are connected together with a synchronizing belt or transmission means such as gear wheels so that they are capable of synchronous rotation.

The upper rollers in the transport roller pairs 52 and 54 are adapted to either approach or depart from the lower rollers independently of each other and the advancing edge of each sheet of light-sensitive material A is smoothly fed into and gripped by the respective roller pairs 52 and 54 and, at the same time, the trailing edge of the light-sensitive material A is smoothly released from the grip by those roller pairs and allowed to emerge therefrom so that there will be little or no unevenness and other troubles while the sheets of light-sensitive material A are transported in the auxiliary scanning direction by means of the transport roller pairs 52 and 54.

The mechanism of the auxiliary scanning section 18 to be used in the invention is by no means limited to the above-described means of transport in the auxiliary scanning direction which employs two transport roller pairs. Any other transport means can be employed insofar as it is capable of transport in the auxiliary scanning direction of various kinds of light-sensitive material in sheet form that are to be subjected to scan exposure, in particular, raster scan exposure. Two examples of such alternative transport means are as follows: a means of transport in the auxiliary scanning direction which uses an exposing drum that transports the light-sensitive material A as it is held in registry with the recording position X and two nip rollers that are placed on opposite sides of the recording position X and in contact with the exposing drum; a transport means which transports the light-sensitive material A in the auxiliary scanning direction as it is placed on a conveyor belt.

The main scanning section 20 is an optical unit for performing digital exposure using light beams L such as laser beams. Although not shown, the main scanning section 20 comprises a light source assembly emitting light beams for performing exposure of the light-sensitive material A to red (R), green (G) and blue (B) lights, a modulating means such as AOM (acoustic optical modulator) that modulates the issued light beams in accordance with the recording digital image signals, an optical deflector such as a polygonal mirror that deflects the modulated light beams in the main scanning direction (normal to the plane of FIG. 1), and an optical element such as an fθ (scanning) lens with which the light beams L deflected in the main scanning direction are focused to form a beam spot of a specified diameter at a specified point on the exposing position X (scanning line); these optical parts and elements are assembled on optical flats and so forth that compose an enclosure. The main scanning section 20 to be used in the invention may be any optical beam scanner that is capable of modulating, pixel for pixel, the light beams for exposure to three primaries in accordance with the digital image signals for the respective colors, optionally combining the modulated trichromatic light beams, deflecting the combined or uncombined light beams in the main scanning direction, and emitting the deflected light beams L. As long as this requirement is met, any known optical beam scanner may be employed.

It should be noted that the main scanning section 20 that can be used in the invention is in no way limited to the above-mentioned optical beam scanner and it may be replaced by various kinds of exposing means based on digital image signals using various arrays of light-emitting devices and spatial modulating devices which extend in the main scanning direction perpendicular to the transport of the light-sensitive material A in the auxiliary scanning direction. Specific examples of such exposing means are raster exposing means based on digital image signals using a PDP (plasma display) array, an ELD (electroluminescent display) array, an LED (light-emitting diode) array, an LCD (liquid-crystal display) array, a DMD (digital micromirror device) array, a laser array and so forth.

After the exposing step, the light-sensitive material A is transported to the distributing section 22. The distributing section 22 distributes individual sheets of the light-sensitive material A in the main scanning direction perpendicular to its transport (which direction is hereinafter referred to as the "lateral direction" for the sake of convenience), as required by the size and other parameters of the light-sensitive material A.

With common silver salt photographic materials which are currently used in photography, development processing is more time-consuming than exposure and, if exposure is performed continuously, development processing cannot keep pace with the exposure but lags behind it and this introduces the need for storing temporarily the as-exposed light-sensitive material in a reservoir, a stocker or the like.

The distributing section 22 is provided with a view to eliminating this difficulty and by distributing a single row of sheets of the light-sensitive material A in the lateral direction perpendicular to their transport so that they are rearranged in a plurality of rows in the direction of transport, the throughput of the developing machine 25 can be improved (almost doubled in two rows and tripled in three rows) and the time difference between development processing and exposure is satisfactorily cancelled.

The distributor to be used in the distributing section 22 is not limited to any particular type and various methods are available that receive individual sheets being supplied in a single row and which distribute them into a plurality of rows. The following examples may be given: a device that distributes the sheets using a circular turret capable of rotation about a shaft; a device in which the means of transporting the light-sensitive material A is divided into a plurality of blocks, say, three blocks and the center block is moved in the lateral direction to distribute the incoming sheets into a plurality of rows; a device in which belt conveyors as transport means which carries the individual sheets of light-sensitive material A and transports them downstream are combined with lift transport means which lifts the sheets of light-sensitive material A using suckers or the like and transports them in the lateral direction such that when the sheets of light-sensitive material A have been transported by the upstream conveyors to a specified position, the lift transport means turns on to lift the sheets and transports them either in the lateral direction or in an oblique lateral (downstream) direction to be distributed in a plurality of rows; and a device comprising a plurality of spaced belt conveyors as transport means that transports the light-sensitive material A downstream and semicircular (D-shaped) roller pairs which are provided between adjacent belt conveyors to distribute individual sheets of the light-sensitive material A in the lateral direction to form a plurality of rows.

The individual sheets of light-sensitive material A which have been distributed in the lateral direction into a plurality of rows in the distributing section 22 are further transported by a roller pair 60 so that they emerge from the outlet 24 to be fed into the developing machine 25, where they are subjected to a specified development and processing scheme that includes color development, bleach-fixing, rinsing and other steps that are determined by the type of the light-sensitive material A; as a result, the latent image on the light-sensitive material A is rendered visible and the thus processed sheets of light-sensitive material A are dried to yield finished prints, which are rearranged in a single row in the order they were prepared (i.e., the exposure was done) and subsequently ejected into a sorter or the like.

Figure 4:
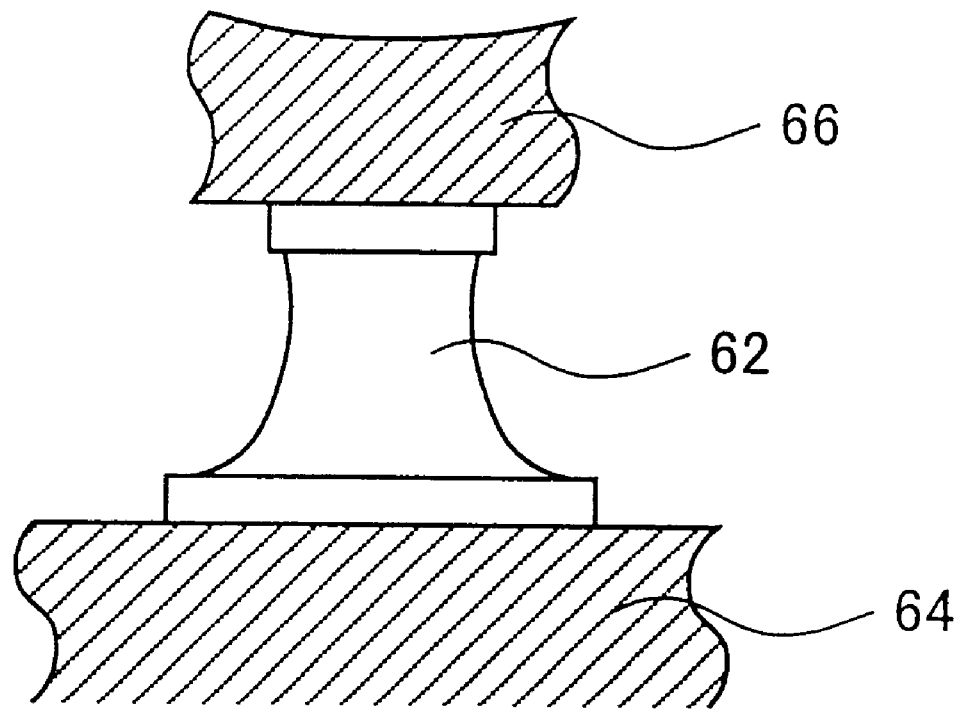
FIG. 4 is a diagram illustrating how an example of the vibration insulator used in the image recording apparatus shown in FIG. 1 is mounted.

In the image recording apparatus 10 of the invention, the frame of the register section 16 (which combines with the back printing section 14 to make up the upstream transport unit), the frame of the auxiliary scanning section 18 and the optical flats of the main scanning section 20 are connected (as indicated by an alternate long and short dash line 66 in FIG. 1) by connecting means such as plates or rods that may serve as stays and fastened into a unitary assembly by fastening means such as screws or bolts and nuts. The unitary assembly of the frame of the upper transport unit including the register section 16, the frame of the auxiliary scanning section 18 and the optical flats of the main scanning section 20 is supported on the main frame 64 of the housing 11 of the apparatus via rubber vibration insulators 62, one of which is shown in FIG. 4. Reference numeral 66 in FIG. 4 shall denote either the frame of the register section 16 or the upstream transport section or the frame of the auxiliary scanning section 18 or the optical flats or enclosure frame of the main scanning section 20 or the frame of the unitary assembly constructed by connecting together these frames and optical flats by suitable connecting and fastening means.

In the illustrated case, the rubber vibration insulators 62 are used as vibration damping means to be interposed between the frame 66 of the unitary assembly and the main frame 64. However, this is not the sole case of the invention and any vibration damping element may be used insofar as it undergoes elastic deformation under compression or shear to absorb the energy of impact or vibration, thereby ensuring that the internal or external vibrations from the main frame 64 are insulated or sufficiently damped. Aside from rubber vibration insulators, various vibration damping elements may be employed, as exemplified by vibration damping cork, pneumatic spring, metal spring and other elastic members that will not cause self-excited oscillation but which are capable of significant energy absorption by the spring action; dynamic dampers using such elastic members may also be adopted. The vibration damping elements or members described above may be used either singly or in combination; for example, rubber vibration insulators 62 may be used in combination with springs (coil springs).

In the case of the invention which is illustrated in FIG. 1, the upstream transport unit (particularly the register section 16), the auxiliary scanning section 18 and the main scanning section 20 are combined into a unitary assembly and the frame of this unitary assembly is delineated by the alternate long and short dash dashed line 66. A plurality of units of the rubber vibration insulator 62 (see FIG. 4), and six units in the illustrated case, are interposed between the frame 66 and the main frame 64 supported on the housing 11 of the apparatus 10 so as to achieve vibrational insulation between the two frames, thereby ensuring that neither internal nor external vibrations will be transmitted to the frame 66 of the unitary assembly. As a result, offsets in the relative positions of the register section 16, the auxiliary scanning section 18 and the main scanning section 20, offsets in the position of the light-sensitive material A, unevenness in its transport in the auxiliary scanning direction and other problems that would otherwise occur from the internal or external vibrations can be effectively prevented and, hence, high-quality and uniform images can at all times be recorded without suffering from the problem of unevenness in image.

In the case illustrated in FIG. 1, the register section 16, the auxiliary scanning section 18 and the main scanning section 20 are supported on the main frame 64, with two rubber vibration insulators 62 being placed under each section and a total of six insulators for the frame 66 of the unitary assembly. This is not the sole case of the invention and the number of rubber vibration insulators 62 to be employed and the positions in which the rubber vibration insulators 62 are to be interposed between the main frame 64 and the frame 66 of the unitary assembly may be adjusted as appropriate for the specific need.

Described above is the basic construction of the image recording apparatus of the invention.

In the above-described case of the image recording apparatus 10, the upstream transport unit including the register section 16, the auxiliary scanning section 18 and the main scanning section 20 are combined into a unitary assembly, which is supported on the main frame 64 via a plurality of rubber vibration insulators 62. If desired, the whole upstream transport unit including both the register section 16 and the back printing section 14 may be combined with the auxiliary scanning section 18 and the main scanning section 20. Alternatively, only the auxiliary scanning section 18 and the main scanning section 20 may be combined into a unitary assembly as delineated by a dotted line in FIG. 1 (the upstream transport unit including the register section 16 is not a part of the unitary assembly), with the frame 68 of the unitary assembly being supported on the main frame 64 via rubber vibration insulators 62.

In this alternative case where only the main scanning section 20 and the auxiliary scanning section 18 are combined into a unitary assembly enclosed with the frame 68, internal and external vibrations may cause positional offsets between the register section 16 and the auxiliary scanning section 18 in both the main and auxiliary scanning directions, whereupon the light-sensitive material A is positionally offset in both the main and auxiliary scanning directions. If the positional offset of the light-sensitive material A is in the auxiliary scanning direction, its leading edge is detected by the edge detecting sensor 58 in the auxiliary scanning section 18, so the time of starting image recording in the auxiliary scanning direction by means of the light beams L from the main scanning section 20 is appropriately controlled to eliminate the possibility for an offset to occur in the position on the light-sensitive material A where recording starts.

On the other hand, if the positional offset of the light-sensitive material A is in the main scanning direction, the time of starting line-for-line image recording in the main scanning direction by means of the deflected light beams L from the main scanning section 20, which is controlled by the step of alignment in the register section 16, is unavoidably offset, whereupon there occurs an offset in the start of recording on the light-sensitive material A. In an extreme case, some areas of the light-sensitive material A will remain blank (no image is recorded at all) or the image to be recorded fails to be formed on the light-sensitive material A.

If this situation is expected, not only the edge detecting sensor 58 which detects the leading and trailing edges (in the auxiliary scanning direction) of the light-sensitive material A but also a position sensor (not shown) for detecting the position of the light-sensitive material A in the main scanning direction, for example, an edge or edges thereof in the direction of width (in the main scanning direction) has to be provided in the auxiliary scanning section 18 so that the detected position in the main scanning direction or its departure from the appropriate position is referenced to control the timing of starting the recording of an image in the main scanning direction with the light beams L from the main scanning section 20. In this way, the recording of an image on the light-sensitive material A with the light beams L can be started in the correct position, and offsets in the position of the light-sensitive material A, unevenness in its transport in the auxiliary scanning direction and other problems that would otherwise occur from the internal or external vibrations can be effectively prevented and, hence, high-quality and uniform images can at all times be recorded without suffering from the problem of unevenness in image.

Figure 5A:
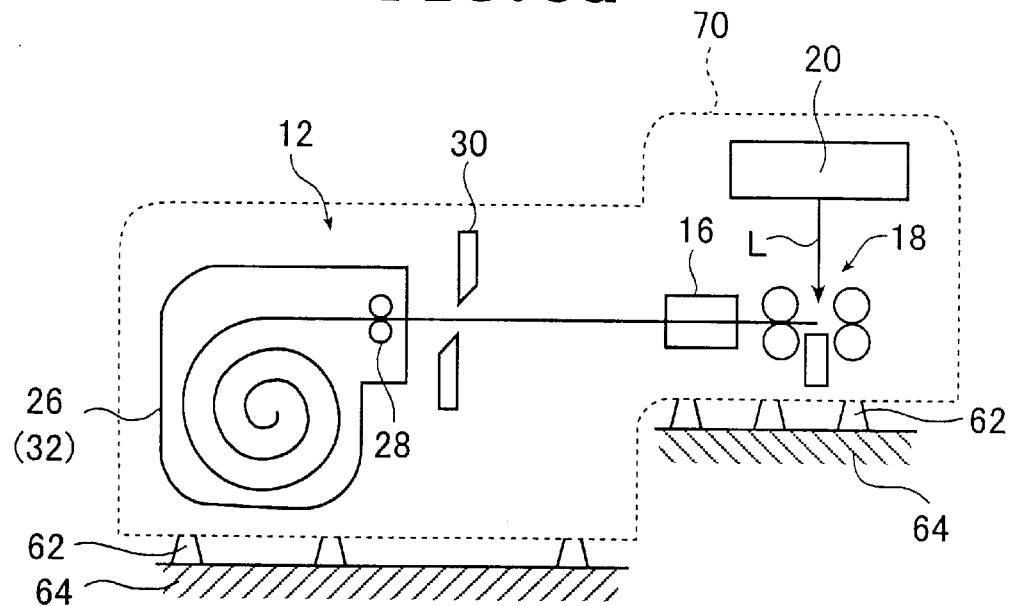
FIGS. 5a and 5b are schematic diagrams showing two different cases of operation of another embodiment of the image recording apparatus of the invention.
Figure 5B:
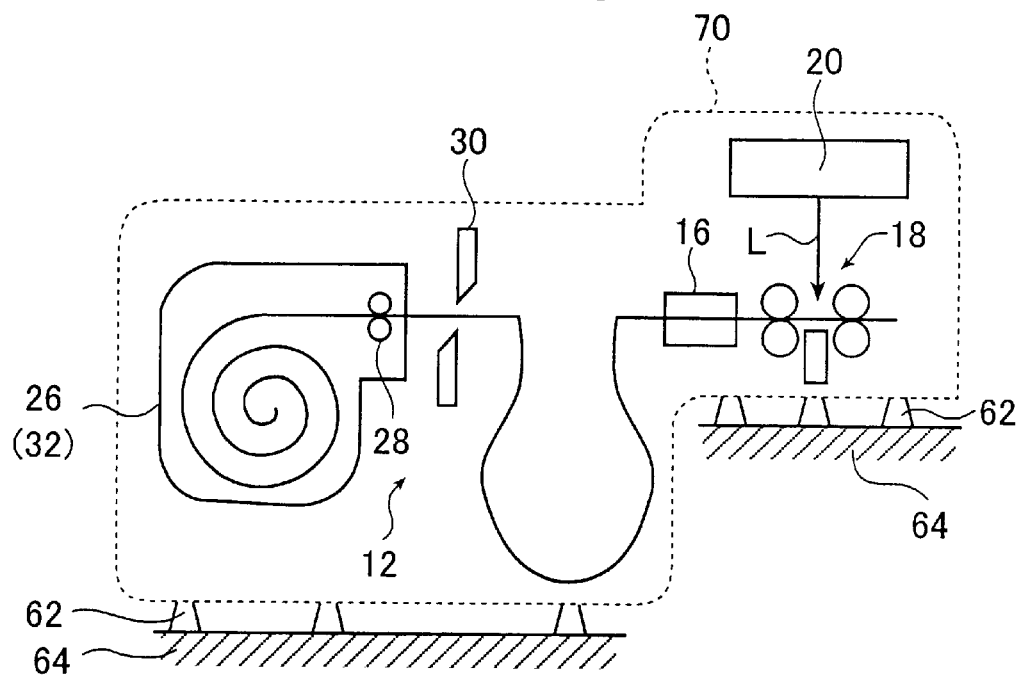
Figure 6:
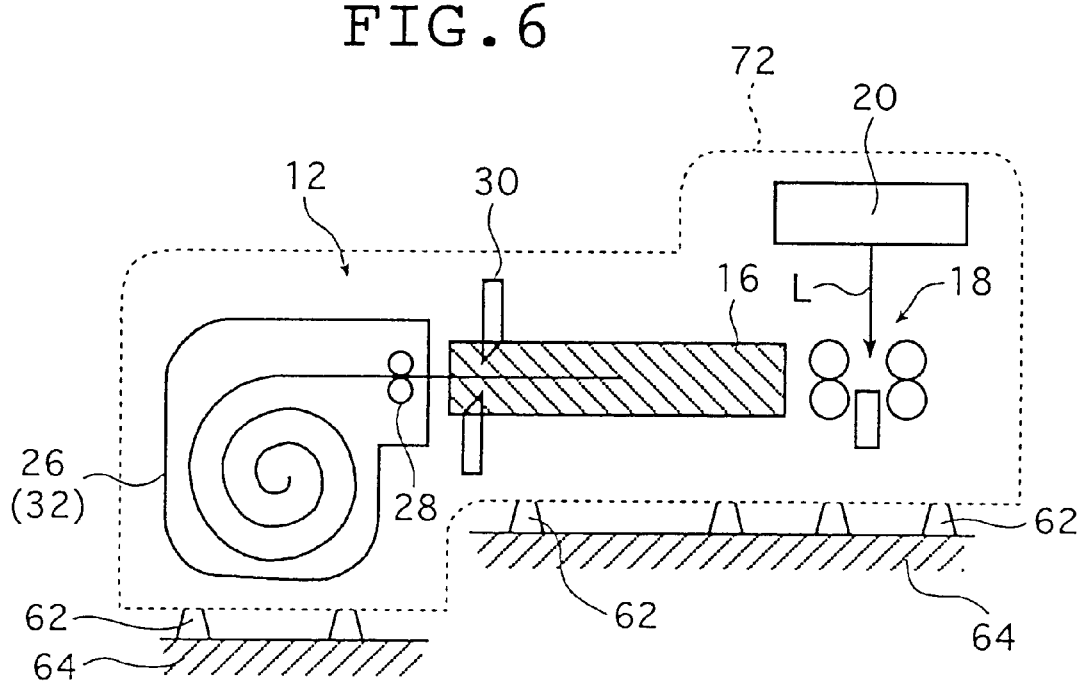
FIG. 6 is a diagram illustrating yet another embodiment of the image recording apparatus of the invention.

FIGS. 5*a*, 5*b* and 6 show other embodiments of the invention, in which not only the upstream transport unit including the register section 16, the auxiliary scanning section 18 and the main scanning section 20 but also the supply section 12 which is located further upstream of the upstream transport unit and which includes the cutters 30, withdrawing rollers 28 and loaders 26 of the magazines 32 of light-sensitive material A is included as a part of a unitary assembly and its frame 70 (see FIGS. 5*a* and 5*b*) or 72 is supported on the main frame 64 of the housing 11 of the apparatus via rubber vibration insulators 62.

Making a vibration-proof construction by combining the loaded magazines 32 of light-sensitive material A with the register section 16, the auxiliary scanning section 18 and the main scanning section 20 to form a unitary assembly is necessary and effective in the following two cases; one is shown in FIGS. 5*a* and 5*b*, where the path of transport from the magazine 32 to the auxiliary scanning section 18 is very short and as sheets of the light-sensitive material A are transported in the auxiliary scanning direction through the auxiliary scanning section 18 and subjected to exposure by raster scanning with the light beams L from the main scanning section 20, the light-sensitive material A is unreeled and drawn out of the magazine 32 by a specified length by means of the withdrawing roller pair 28 and subsequently cut into sheets of a given length by means of the cutter 30; the other case is shown in FIG. 6, where the register section 16 is provided just next to the outlet of the magazine 32 and sheets of the light-sensitive material A are transported to the auxiliary scanning section 18 as they are aligned in the main scanning direction (lateral direction) at a site just next to the outlet of the magazine 32.

If the web of light-sensitive material A is cut into sheets with the cutter 30 as it is transported in the auxiliary scanning direction as shown in FIGS. 5a and 5b, it is necessary to ensure that the cutting action will in no way affect the transport of the light-sensitive material A in the auxiliary scanning direction through the auxiliary scanning section 18 and its exposure in the main scanning section 20. To meet this requirement, a loop of a specified size is formed of the light-sensitive material A in the space between the cutter 30 and the register section 16 before it is cut with the cutter 30 as shown in FIG. 5b. In the, case shown in FIG. 6, the light-sensitive material A as cut to a specified length with the cutter 30 must then be transported in the auxiliary scanning direction for exposure. If successive sheets of the light-sensitive material A can be aligned in the main scanning direction by means of the register section 16, the distance from the magazine 32 to the auxiliary scanning section 18 can be made as short as in the case shown in FIGS. 5a and 5b.

Thus, according to additional embodiments of the invention, the supply section 12, the register section 16, the auxiliary scanning section 18 and the main scanning section 20 are combined to form a unitary assembly, of which the frame 70 or 72 is supported on the main frame 64 via rubber vibration insulators 62. Even in this case, offsets in the position of the light-sensitive material A, unevenness in its transport in the auxiliary scanning direction and other problems that would otherwise occur from the internal or external vibrations can be effectively prevented and, hence, high-quality and uniform images can at all times be recorded without suffering from the problem of unevenness in image.

While the image recording apparatus of the invention has been described above with reference to various embodiments, the invention is by no means limited to these particular embodiments and various improvements and design modifications can of course be made without departing from the scope and spirit of the invention.

As described above in detail, the present invention ensures that during image recording on sheets of light-sensitive material with light beams, any adverse effects of internal and external vibrations are sufficiently prevented, insulated or damped to prevent the occurrence of offsets in the position of the light-sensitive material, unevenness in its transport in the auxiliary scanning direction and other problems that would otherwise cause unevenness in image.

Consequently, the invention has the advantage of recording uniform high-quality images correctly at all times on sheets of light-sensitive material.

What is claimed is:

1. An image recording apparatus comprising:

a main scanning section having an optical system for issuing recording light beams either deflected or arranged one-dimensionally in a main scanning direction, said main scanning section performing main scanning with said issued recording light beams;

an auxiliary scanning section by means of which a sheet of a light-sensitive material to be illuminated with said issued recording light beams from said main scanning section is transported in an auxiliary scanning direction perpendicular or substantially perpendicular to said main scanning direction;

an upstream transport section that is located upstream of said auxiliary scanning section in a transport direction of said sheet of the light-sensitive material, that transports said light-sensitive material and which has a register unit by which a position of said sheet of the light-sensitive material in said main scanning direction before it is transported to said auxiliary scanning direction is controlled and brought into alignment with a prescribed position;

said main scanning section, said auxiliary scanning section and said upstream transport section being combined together to form a unitary assembly; and a vibration damping unit supporting said unitary assembly with respect to other components of the image recording apparatus in such a way as to insulate vibrations from being transmitted to said unitary assembly, wherein said sheet of the light-sensitive material, as it is transported in said auxiliary scanning direction after its position in said main scanning direction was regulated by said upstream transport section, is illuminated with said recording light beams that perform main scanning in said main scanning direction, whereby said sheet of the light-sensitive material is scanned two-dimensionally with said recording light beams to record an image on said light-sensitive material.

2. The image recording apparatus according to claim 1, wherein an optical flat of said main scanning section, said auxiliary scanning section and said upstream transport section are connected and fixed by a connecting device to form the unitary assembly, and the unitary assembly is supported on a main frame of the image recording apparatus with said vibration damping unit.

3. The image recording apparatus according to claim 1, which further includes a light-sensitive material supply section comprising:

a magazine that is located upstream of said upstream transport section and which contains a roll of said light-sensitive material; and a cutter by means of which said roll of the light-sensitive material as unreeled from said magazine is cut to said sheet of the light-sensitive material having a specified length which is determined by said image to be recorded.

4. The image recording apparatus according to claim 3, wherein said main scanning section, said auxiliary scanning section, said upstream transport section and said light-sensitive material supply section are combined into a unitary assembly and supported on a main frame of the image recording apparatus with said vibration damping unit in such a way as to insulate vibrations.

5. The image recording apparatus according to claim 4, wherein an optical flat of said main scanning section, said auxiliary scanning section, said upstream transport section and said light-sensitive material supply section are connected and fixed by said connecting device to form the unitary assembly, and the unitary assembly is supported on the main frame of the image recording apparatus with said vibration damping unit.

6. The image recording apparatus according to claim 3, wherein a loop is formed of said unreeled roll of the light-sensitive material between said cutter in said light-sensitive material supply section and said register unit in said upstream transport section, and wherein said unreeled roll of the light-sensitive material to be subjected to main scanning in said main scanning section is cut to said sheet of the light-sensitive material having said specified length by means of said cutter as it is transported in the auxiliary scanning direction through said auxiliary scanning section.

7. The image recording apparatus according to claim 3, wherein said register unit in said upstream transport section is located just next to said cutter in said light-sensitive material supply section, and said sheet of the light-sensitive material is transported by means of said upstream transport section as its position in said main scanning direction is aligned to the prescribed position by said register unit.

8. The image recording apparatus according to claim 1, wherein said auxiliary scanning section has sensors for detecting positions in both said main and auxiliary scanning directions of said sheet of the light-sensitive material being transported in the auxiliary scanning direction, and a unit that adjusts a recording position in which said image is to be recorded on said sheet of the light-sensitive material with said recording light beams.

9. The image recording apparatus according to claim 1, wherein said upstream transport section comprises:
   an upstream transport roller pair for receiving said sheet of the light-sensitive material from an upstream side in the auxiliary scanning direction and supplying it to said register unit;
   said register unit for regulating a posture and the position of said sheet of the light-sensitive material in the main scanning direction, that is being transported by said upstream transport roller pair; and
   a downstream transport section for transporting, to the auxiliary scanning section, said sheet of the light-sensitive material, said posture and said position of which have been correctly adjusted by means of said upstream transport roller pair and said register unit.

10. The image recording apparatus according to claim 1, wherein said vibration damping unit is at least one selected from the group consisting of a rubber vibration insulators, a vibration damping cork, a pneumatic spring for vibration damping, a metal spring for vibration damping, a dynamic damper and a combination thereof.

11. The image recording apparatus according to claim 1, wherein said vibration damping unit is at least one of a rubber vibration insulator alone and a combination of the rubber vibration insulator and a spring.

12. The image recording apparatus according to claim 1, further comprising a back printing section that is located upstream of said upstream transport section and records back print information on a back side of said sheet of the light-sensitive material.

13. The image recording apparatus according to claim 12, wherein said main scanning section, said auxiliary scanning section, said upstream transport section and said back printing section are combined into a unitary assembly and supported on a main frame of the image recording apparatus with said vibration damping unit in such a way as to insulate vibrations.

14. The image recording apparatus according to claim 1, further comprising a distributing section that is located downstream of said auxiliary section and distributes said sheet of the light-sensitive material into one of a plurality of rows in the main scanning direction.

15. An image recording apparatus comprising:
   a main scanning section having an optical system for issuing recording light beams either deflected or arranged one-dimensionally in a main scanning direction, said main scanning section performing main scanning with said issued recording light beams;
   an auxiliary scanning section by means of which a sheet of a light-sensitive material to be illuminated with said issued recording light beams from said main scanning section is transported in an auxiliary scanning direction perpendicular or substantially perpendicular to said main scanning direction;
   an upstream transport section that is located upstream of said auxiliary scanning section in a transport direction of said sheet of the light-sensitive material, that transports said light-sensitive material and which has a register unit by which a position of said sheet of the light-sensitive material in said main scanning direction before it is transported to said auxiliary scanning direction is controlled and brought into alignment with a prescribed position, wherein said register unit comprises a transport guide which regulates a posture of said sheet of the light-sensitive material and said position of said sheet of the light-sensitive material in the main scanning direction;
   said main scanning section, said auxiliary scanning section and said upstream transport section being combined together to form a unitary assembly; and
   a vibration damping unit supporting said unitary assembly with respect to other components of the image recording apparatus in such a way as to insulate vibrations from being transmitted to said unitary assembly, wherein said sheet of the light-sensitive material, as it is transported in said auxiliary scanning direction after its position in said main scanning direction was regulated by said upstream transport section, is illuminated with said recording light beams that perform main scanning in said main scanning direction,
   whereby said sheet of the light-sensitive material is scanned two-dimensionally with said recording light beams to record an image on said light-sensitive material.

16. The image recording apparatus according to claim 15, wherein said register unit functions as a width guide that regulates one or both of edges of said sheet of the light-sensitive material in the main scanning direction from one side or opposite sides thereof so that said posture of said sheet of the light-sensitive material is kept parallel to the auxiliary scanning direction, whereas at least one edge position or a center position of said sheet of the light-sensitive material in the main scanning direction is brought into registry with a specified regulated position.

17. The image recording apparatus according to claim 15, wherein said register unit functions as a loop guide that guides said sheet of the light-sensitive material downstream in the auxiliary scanning direction and which is capable of forming a loop of said sheet of the light-sensitive material, and functions as an edge guide which guides said sheet of the light-sensitive material in the main scanning direction being a width direction of said sheet of the light-sensitive material so that said position of said sheet of the light-sensitive material in the width direction is regulated and said posture of said sheet of the light-sensitive is controlled.

18. The image recording apparatus according to claim 15, wherein said register unit comprises:

a pair of U-shaped width guides that can approach and depart from each other;

split transport roller pairs that are provided along the main scanning direction in correspondence with recesses formed inside said pair of U-shaped width guides on a midway in the auxiliary scanning directions; and pivotal guides that are provided upstream of said split transport roller pairs in the auxiliary scanning direction and which are supported in such a way that the pivotal guides can pivot along rotating shafts of said split transport roller pairs and outside said split transport roller pairs.

19. The image recording apparatus according to claim 15, wherein said register unit attains center registry in which a center position of said sheet of the light-sensitive material in the main scanning direction is controlled and brought into agreement with a specified regulated position.

20. The image recording apparatus according to claim 15, wherein said register unit attains side registry in which a position of at least one edge of said sheet of the light-sensitive material in the main scanning direction is controlled and brought into agreement with a specified regulated position.

* * * * *